USOO8994870B2

(12) United States Patent  (10) Patent No.: US 8,994,870 B2
Imamura  (45) Date of Patent: Mar. 31, 2015

(54) IMAGING APPARATUS, AND SYSTEM AND DISTANCE MEASURING DEVICE USING IMAGING APPARATUS

(71) Applicant: Panasonic Corporation, Osaka (JP)

(72) Inventor: Norihiro Imamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 128 days.

(21) Appl. No.: 13/932,505

(22) Filed: Jul. 1, 2013

(65) Prior Publication Data

US 2013/0293703 A1    Nov. 7, 2013

Related U.S. Application Data

(63) Continuation of application No. PCT/JP2012/005490, filed on Aug. 30, 2012.

(30) Foreign Application Priority Data

Oct. 3, 2011    (JP) .................................. 2011-219386

(51) Int. Cl.
  *H04N 5/225*    (2006.01)
  *G02B 13/16*    (2006.01)
  (Continued)

(52) U.S. Cl.
  CPC ......... *H04N 5/2254* (2013.01); *H04N 5/35563* (2013.01); *G01C 11/00* (2013.01)
  USPC ........... 348/340; 348/335; 348/235; 348/237; 348/234; 396/111

(58) Field of Classification Search
  CPC ... H04N 9/045; H04N 5/2254; H04N 5/3532; H04N 5/351; H04N 5/355; H04N 5/235–5/238

USPC ........... 348/335, 340, 360–368, 222.1, 223.1, 348/224.1, 225.1, 229.1, 230.1, 234, 235, 348/237, 238, 266–283; 396/111
  See application file for complete search history.

(56) References Cited

U.S. PATENT DOCUMENTS 5,289,286 A       2/1994   Nakamura et al.
6,355,930 B1 *    3/2002   Sivathanu et al. ....... 250/339.02
(Continued)

FOREIGN PATENT DOCUMENTS

JP    03-117281 A    5/1991
JP    05-030350 A    2/1993
(Continued)

OTHER PUBLICATIONS

International Search Report for corresponding International Application No. PCT/JP2012/005490 mailed Sep. 25, 2012.
(Continued)

*Primary Examiner* — Chia-Wei A Chen
(74) *Attorney, Agent, or Firm* — Renner, Otto, Boisselle & Sklar, LLP

(57) ABSTRACT

An imaging apparatus disclosed in the present application includes a lens optical system including a lens and a stop; an imaging; and an array-form optical element located between the lens optical system and the imaging device and including optical components extending in a row direction in a plane vertical to an optical axis of the lens optical system, the optical components being arrayed in a column direction in the plane. The imaging device includes pixel groups, each of which includes first pixels arrayed in the row direction and second pixels arrayed in the row direction at positions adjacent, in the column direction, to the first pixels. The pixel groups are arrayed in the column direction. Border positions between the optical components are respectively offset in the column direction with respect to corresponding border positions between the pixel groups.

17 Claims, 13 Drawing Sheets

(51) Int. Cl.
*H04N 9/68* (2006.01)
*G02B 7/28* (2006.01)
*G03B 7/099* (2014.01)
*H04N 5/355* (2011.01)
*G01C 11/00* (2006.01)

(56) References Cited

U.S. PATENT DOCUMENTS

| | | | |
|---|---|---|---|
| 6,411,329 B1 * | 6/2002 | Richard et al. | 348/157 |
| 6,838,715 B1 * | 1/2005 | Bencuya et al. | 257/291 |
| 7,369,204 B1 * | 5/2008 | Choi et al. | 349/141 |
| 7,400,447 B2 * | 7/2008 | Sudo et al. | 359/463 |
| 7,515,174 B1 * | 4/2009 | Francisco et al. | 348/14.16 |
| 2003/0086008 A1 * | 5/2003 | Nagano | 348/272 |
| 2005/0051860 A1 | 3/2005 | Takeuchi et al. | |
| 2005/0134712 A1 * | 6/2005 | Gruhlke et al. | 348/272 |
| 2007/0103564 A1 * | 5/2007 | Chiba | 348/223.1 |
| 2009/0102953 A1 * | 4/2009 | Bornstein et al. | 348/273 |
| 2009/0153705 A1 * | 6/2009 | Katsuda et al. | 348/273 |
| 2009/0309999 A1 | 12/2009 | Hirai et al. | |
| 2010/0134665 A1 * | 6/2010 | Kanai et al. | 348/280 |
| 2010/0141814 A1 * | 6/2010 | Kanai et al. | 348/280 |
| 2012/0206582 A1 * | 8/2012 | DiCarlo et al. | 348/71 |
| 2012/0307104 A1 * | 12/2012 | Kanai et al. | 348/223.1 |
| 2013/0070146 A1 * | 3/2013 | Imamura | 348/335 |
| 2013/0229543 A1 * | 9/2013 | Hashimoto et al. | 348/222.1 |
| 2013/0321581 A1 * | 12/2013 | El-Ghoroury et al. | 348/46 |
| 2014/0146201 A1 * | 5/2014 | Knight et al. | 348/231.99 |
| 2014/0232894 A1 * | 8/2014 | Olsen et al. | 348/222.1 |

FOREIGN PATENT DOCUMENTS

| | | |
|---|---|---|
| JP | 06-163864 A | 6/1994 |
| JP | 2002-006205 A | 1/2002 |
| JP | 2002-101347 A | 4/2002 |
| JP | 2005-086083 A | 3/2005 |
| JP | 2005-259750 A | 9/2005 |
| JP | 2007-311899 A | 11/2007 |
| JP | 2009-031682 A | 2/2009 |
| JP | 2009-303043 A | 12/2009 |
| JP | 2010-147786 A | 7/2010 |
| JP | 2011-082795 A | 4/2011 |

OTHER PUBLICATIONS

Form PCT/ISA/237 for corresponding International Application No. PCT/JP2012/005490 dated Sep. 25, 2012 and partial English translation.

* cited by examiner

FIG.1A
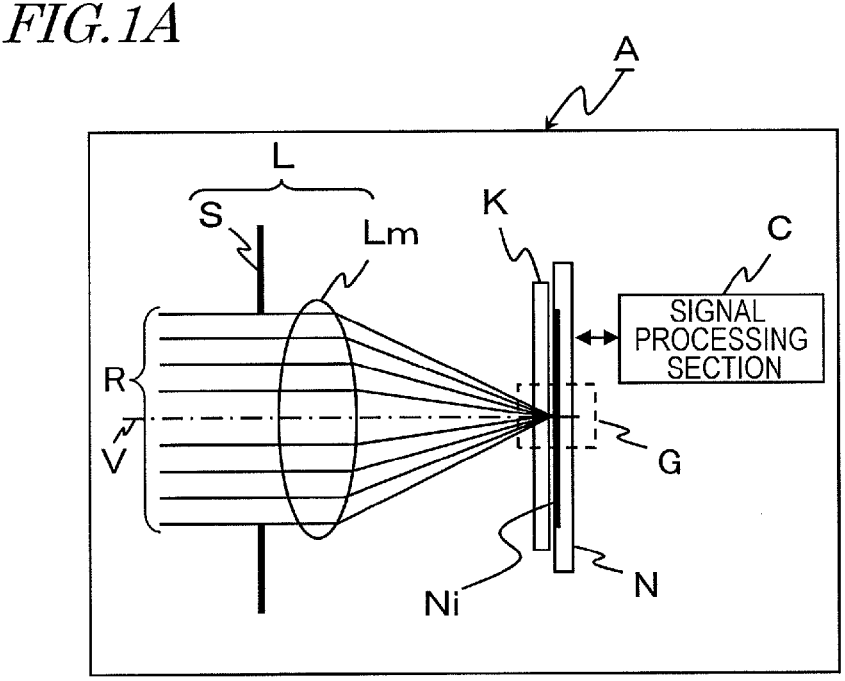
FIG.1B  COLUMN DIRECTION
⊙ ROW DIRECTION
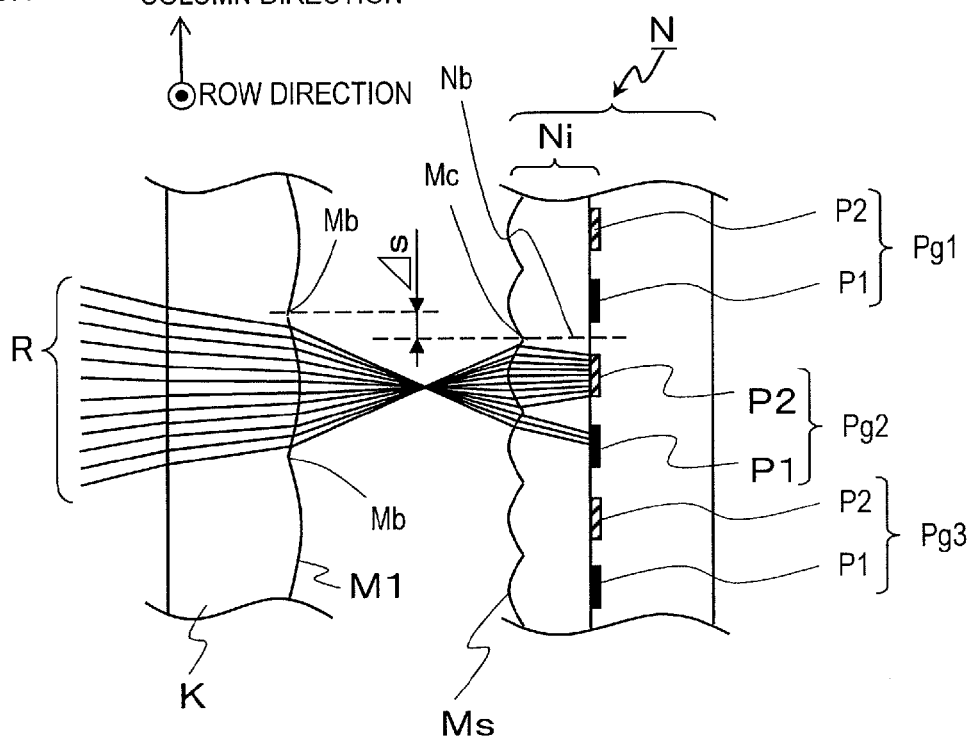

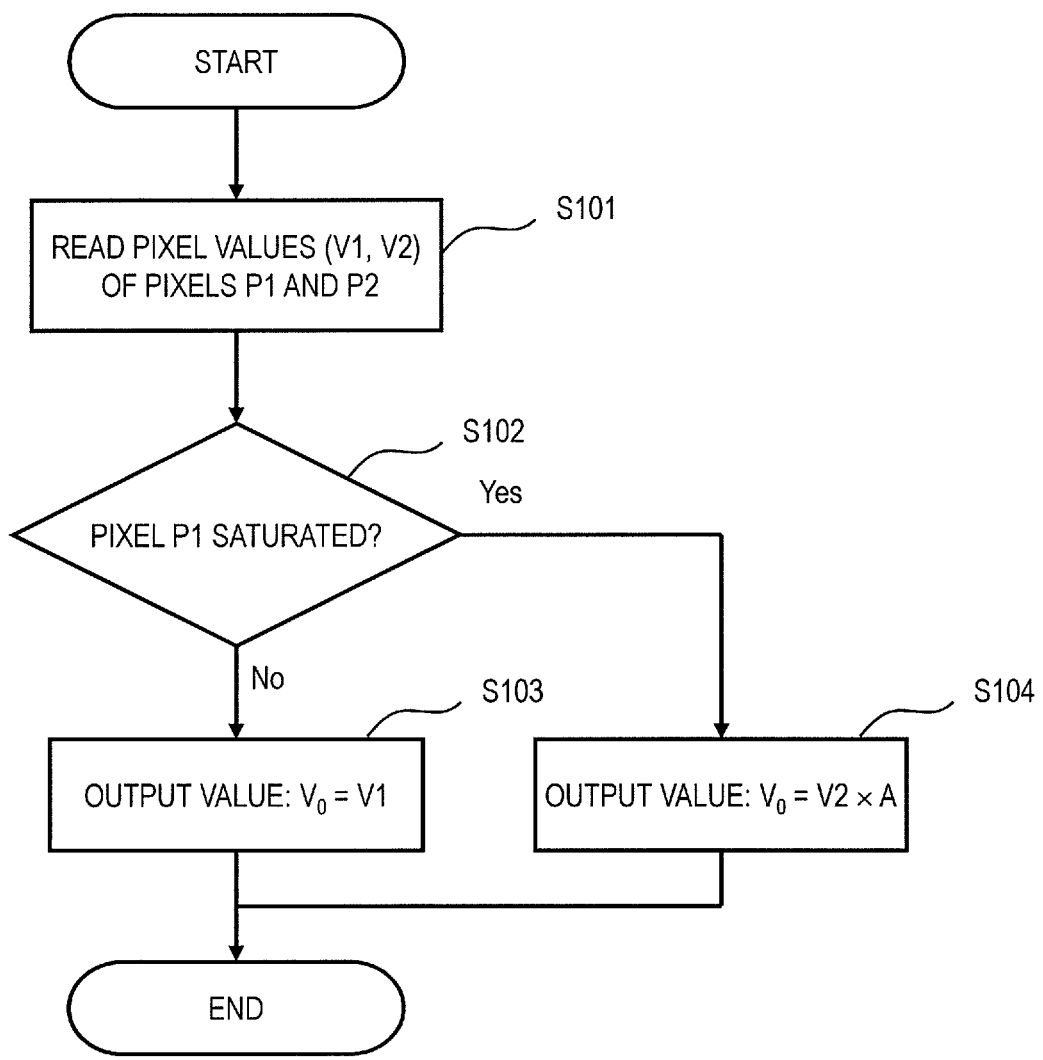

IMAGING APPARATUS, AND SYSTEM AND DISTANCE MEASURING DEVICE USING IMAGING APPARATUS

This is a continuation of International Application No. PCT/JP2012/005490, with an international filing date of Aug. 30, 2012, which claims priority of Japanese Patent Application No. 2011-219386, filed on Oct. 3, 2011, the contents of which are hereby incorporated by reference.

BACKGROUND

1. Technical Field

The present application relates to an imaging apparatus such as a camera or the like, and a system and a distance measuring device using the imaging apparatus.

2. Description of the Related Art

As a technology for acquiring a high dynamic range image, the following methods are known: a method of providing a logarithm conversion type imaging device, and a method of synthesizing two images obtained by image pickup performed by use of two imaging apparatus with different exposure values. In addition, a method of synthesizing images obtained by image pickup performed with different exposure time durations in a time division manner is also known.

Japanese Laid-Open Patent Publication No. 5-30350 (hereinafter, referred to as Patent Document 1) discloses a method used for a logarithm conversion type imaging apparatus. According to this method, in order to correct non-uniformity of the pixel-by-pixel sensitivity difference, image data stored on a memory obtained with uniform light radiation is subtracted from image data on each pixel.

Japanese Laid-Open Patent Publication No. 2009-31682 (hereinafter, referred to as Patent Document 2) discloses a method by which an optical path is divided by a prism and imaging is performed by use of two imaging devices with different shooting conditions (exposure values).

The method of synthesizing images obtained by image pickup performed with different exposure time durations in a time division manner has the following problem. The images of a subject are picked up in a time division manner. Therefore, while the subject is moving, images are shifted due to time difference, which causes a problem that the continuity of the images is disturbed. Japanese Laid-Open Patent Publication No. 2002-101347 (hereinafter, referred to as Patent Document 3) discloses a technology for correcting an image shift caused by such a system.

SUMMARY

The method of Patent Document 1 requires a circuit for performing logarithm conversion of a pixel signal for each pixel, which prevents decrease of the pixel size. The method of Patent Document 1 also requires means for storing correction data for correcting the pixel-by-pixel sensitivity non-uniformity, which raises the cost.

The method of Patent Document 2 requires two imaging devices, which enlarges the imaging apparatus and significantly raises the cost.

Patent Document 3 discloses the technology for correcting the image shift, but it is impossible in principle to completely correct the image shift caused by the time difference for all movable bodies.

A non-limiting illustrative embodiment of the present application provides an imaging apparatus for acquiring a plurality of pieces of information at the same time by use of one imaging device to generate a high dynamic range image, the imaging apparatus capable of generating a moving image; and a system and a distance measuring device using the same.

An imaging apparatus in an embodiment according to the present invention includes a lens optical system including a lens and a stop; an imaging device on which light passing through the lens optical system is incident; and an array-form optical element located between the lens optical system and the imaging device and including a plurality of optical components extending in a row direction in a plane vertical to an optical axis of the lens optical system, the plurality of optical components being arrayed in a column direction in the plane. The imaging device includes a plurality of pixel groups, each of which includes a plurality of first pixels arrayed in the row direction and a plurality of second pixels arrayed in the row direction at positions adjacent, in the column direction, to the plurality of first pixels. The plurality of pixel groups are arrayed in the column direction. Border positions between the plurality of optical components are respectively offset with respect to corresponding border positions between the plurality of pixel groups.

The above-described general and specific embodiment can be mounted by use of a system, method or computer program or can be realized by a combination of a system, method and computer program.

According to an imaging apparatus in one embodiment according to the present invention, even when the amount of light (exposure value) supplied to the second pixel is made smaller than the amount of light (exposure value) supplied to the first pixel so that light of a larger amount than a detectable amount is supplied to the first pixel (when the pixel value of the first pixel is saturated), the value detected by the second pixel can be used to calculate an accurate brightness of a subject. By contrast, when light of an amount within a range of amount detectable by the first pixel is supplied to the first pixel (when the pixel value of the first pixel is not saturated), the value detected by the first pixel is usable. Owing to this, a high dynamic range image can be acquired by one cycle of image pickup performed by use of a single imaging system. In one embodiment of the present invention, it is not necessary to use any special imaging device of a logarithm conversion type or the like, and a plurality of imaging devices are not needed.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 1A is a schematic view showing an imaging apparatus A in Embodiment 1 according to the present invention.

FIG. 1B is an enlarged schematic view of an array-form optical element K and an imaging device N shown in FIG. 1A.

FIG. 2 is an isometric view of the array-form optical element K in Embodiment 1 according to the present invention.

FIG. 3A shows the positional relationship between the array-form optical element K and pixels in the imaging device N (monochromatic imaging device) shown in FIG. 1B.

FIG. 3B shows the positional relationship between the array-form optical element K and pixels in the imaging device N (color imaging device) shown in FIG. 1A.

FIG. 4 is a cross-sectional view of the imaging apparatus A in Embodiment 1 according to the present invention.

FIG. 5A shows optical ray tracing simulation, which shows how the light rays passing through the array-form optical element K in Embodiment 1 according to the present invention reach the pixels on an imaging plane Ni of the imaging device N.

FIG. 7 is a flowchart for generating a high dynamic range image in Embodiment 1 according to the present invention.

Figure 12A:
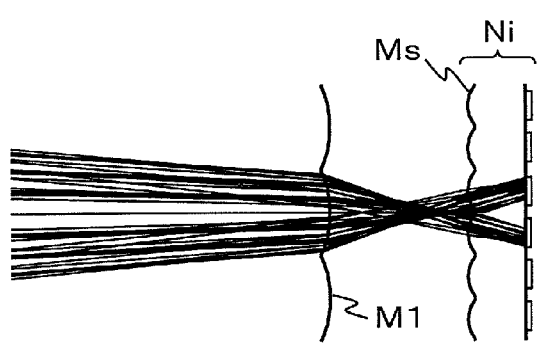

FIG. 12A shows optical ray tracing simulation, which shows how the light rays passing through the array-form optical element K reach the imaging device N in the case where border positions between the optical components of the array-form optical element K are not respectively offset with respect to border positions between the pixels of the imaging device in Embodiment 4 according to the present invention.

Figure 12B:

FIG. 12B is a simulated image picked up by the imaging device N.

Figure 12C:
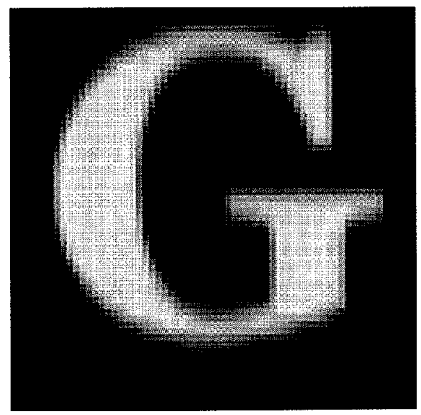

FIG. 12C shows an image generated by extracting the even-numbered columns of the simulated image and complementing the odd-numbered columns thereof.

Figure 12D:
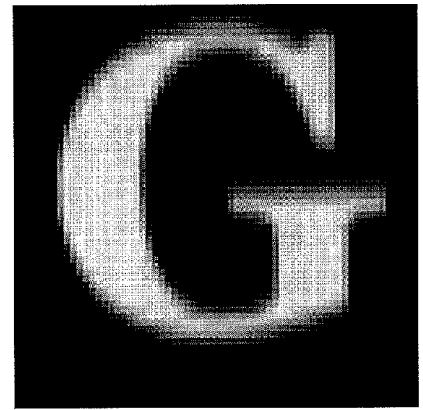

FIG. 12D shows an image generated by extracting the odd-numbered columns of the simulated image and complementing the even-numbered columns thereof.

Figure 13:
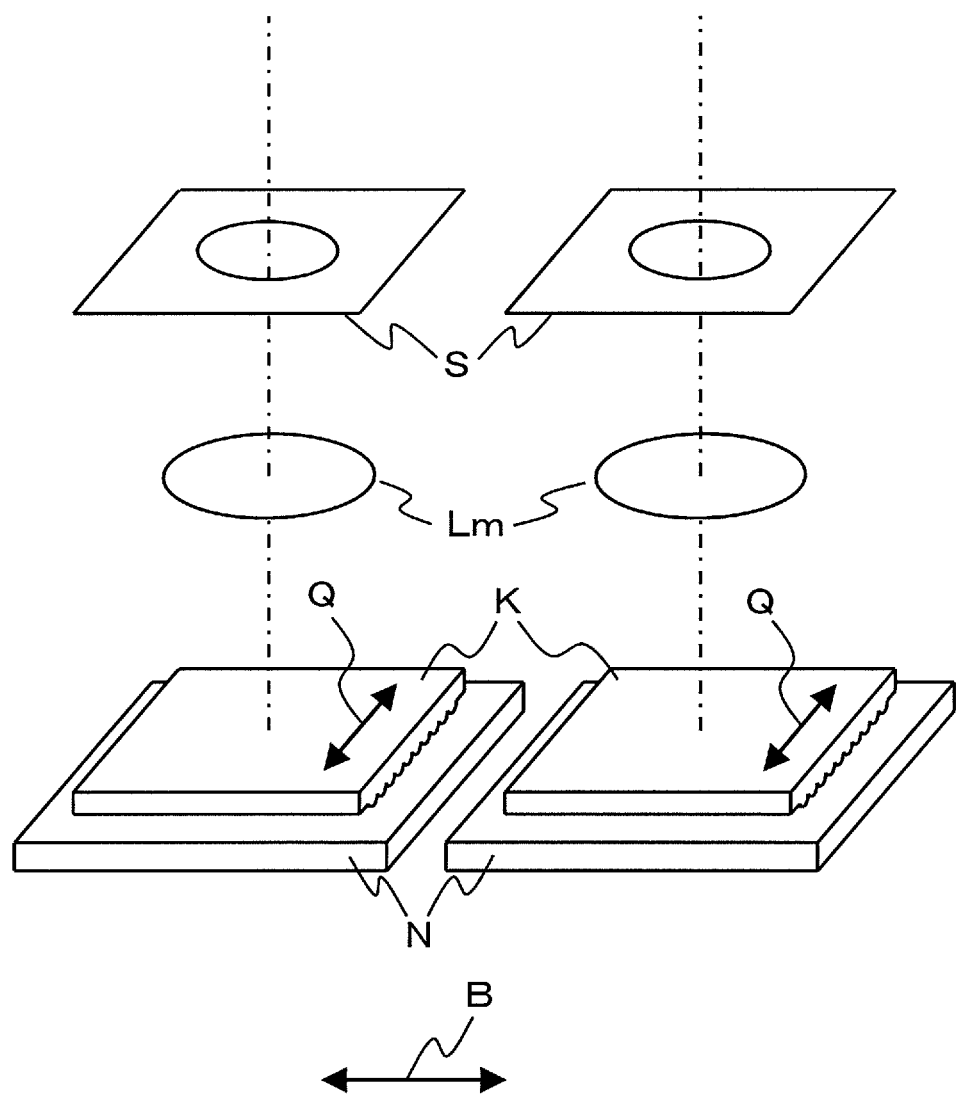

FIG. 13 is a schematic view of a distance measuring device in Embodiment 5 according to the present invention.

DESCRIPTION OF EMBODIMENTS

An overview of an embodiment according to the present invention is as follows.

An imaging apparatus in an embodiment according to includes a lens optical system including a lens and a stop; an imaging device on which light passing through the lens optical system is incident; and an array-form optical element located between the lens optical system and the imaging device and including a plurality of optical components extending in a row direction in a plane vertical to an optical axis of the lens optical system, the plurality of optical components being arrayed in a column direction in the plane. The imaging device includes a plurality of pixel groups arrayed in the column direction, each of which includes a plurality of first pixels arrayed in the row direction and a plurality of second pixels arrayed in the row direction at positions adjacent, in the column direction, to the plurality of first pixels; and border positions between the plurality of optical components are respectively offset in the column direction with respect to corresponding border positions between the plurality of pixel groups.

The border positions between the plurality of optical components may be respectively in offset the column direction with respect to the corresponding border positions between the plurality of pixel groups over an area from a central area to a peripheral area of an imaging plane formed of the plurality of pixel groups.

Each of the plurality of optical components of the array-form optical element may be located so as to correspond to one of the plurality of pixel groups.

In each of the plurality of pixel groups, light from the same part of a subject may be incident on each of the plurality of first pixels and the second pixel adjacent thereto in the column direction.

The array-form optical element may be a lenticular lens.

The array-form optical element may be formed on the imaging device.

The imaging apparatus may further include a microlens provided between the array-form optical element and the imaging device. The array-form optical element may be formed on the imaging device with the microlens provided therebetween.

The lens optical system may be an image-side telecentric optical system; and offset amounts of the border positions between the plurality of optical components with respect to the border positions between the plurality of pixel groups may be equal to each other regardless of a distance from the optical axis in the column direction.

The lens optical system may be an image-side non-telecentric optical system; and offset amounts of the border positions between the plurality of optical components with respect to the border positions between the plurality of pixel groups may be different from each other in accordance with a distance from the optical axis in the column direction.

The imaging apparatus may further include a driving mechanism for controlling a position of the array-form optical element in the column direction. The offset amounts may be adjustable by the driving mechanism.

The imaging apparatus may further include a signal processing section for generating an image by use of a plurality of pixel values obtained by the plurality of first pixels and a plurality of pixel values obtained by the plurality of second pixels. An amount of light supplied to the plurality of first pixels may be A times an amount of light supplied to the plurality of second pixels (A>1); and the signal processing section may perform a process of reading, in each pixel group, a pixel value V1 obtained by one pixel P1 among the plurality of first pixels and a pixel value V2 obtained by one pixel P2 adjacent thereto among the plurality of second pixels; when the pixel value V1 is not saturated, outputting the pixel value V1; and when the pixel value V1 is saturated, outputting a value obtained by multiplying the pixel value V2 obtained by the second pixel by A.

The signal processing section may perform the process for each of the plurality of first pixels and each of the plurality of second pixels.

A system in another embodiment according to the present invention includes any one of the above-described imaging apparatus; and a signal processing section for generating an image by use of a plurality of pixel values obtained by the plurality of first pixels and a plurality of pixel values obtained by the plurality of second pixels. An amount of light supplied to the plurality of first pixels is A times an amount of light supplied to the plurality of second pixels (A>1); and the signal processing section performs a process of reading, in each pixel group, a pixel value V1 obtained by one pixel P1 among the plurality of first pixels and a pixel value V2 obtained by one pixel P2 adjacent thereto among the plurality of second pixels; when the pixel value V1 is not saturated, outputting the pixel value V1; and when the pixel value V1 is saturated, outputting a value obtained by multiplying the pixel value V2 obtained by the second pixel by A.

A distance measuring apparatus in still another embodiment according to the present invention includes a plurality of any one of the above-described imaging apparatus or a plurality of any one of the above-described systems.

An imaging device in still another embodiment according to the present invention includes an array-form optical element including a plurality of optical components extending in a row direction in a prescribed plane, the plurality of optical components being arrayed in a column direction in the plane; and a plurality of pixel groups arrayed in the column direction, each of which includes a plurality of first pixels arrayed in the row direction and a plurality of second pixels arrayed in the row direction at positions adjacent in the column direction to the plurality of first pixels. The array-form optical element is located with respect to the plurality of pixel groups such that border positions between the plurality of optical components are respectively offset in the column direction with respect to corresponding border positions between the plurality of pixel groups.

The border positions of the plurality of optical components may be respectively offset in the column direction with respect to the corresponding border positions between the plurality of pixel groups over an area from a central area to a peripheral area of an imaging plane formed of the plurality of pixel groups.

Each of the plurality of optical components of the array-form optical element may be located so as to correspond to one of the plurality of pixel groups.

Hereinafter, embodiments of an imaging apparatus according to the present invention will be described with reference to the drawings.

Embodiment 1

FIG. 1A is a schematic view showing an imaging apparatus A in Embodiment 1. The imaging apparatus A in this embodiment includes a lens optical system L having an optical axis V, an imaging device N, an array-form optical element K located in the vicinity of a focal point of the lens optical system L in an area between the lens optical system L and the imaging device N, and a first signal processing section C. The signal processing section C may be provided outside the imaging apparatus A.

The lens optical system L includes a stop S on which a light beam R from a subject (not shown) is incident and a lens Lm on which light passing through the stop S is incident. The lens optical system L is an image-side telecentric optical system.

The array-form optical element K is located in the vicinity of the focal point of the lens optical system L, more specifically, at a position farther from the an imaging plane Ni by a prescribed distance.

In FIG. 1A, the light beam R passes through the stop S, the lens Lm, and the array-form optical element K in this order and then reaches the imaging plane Ni of the imaging device N.

Figure 2:
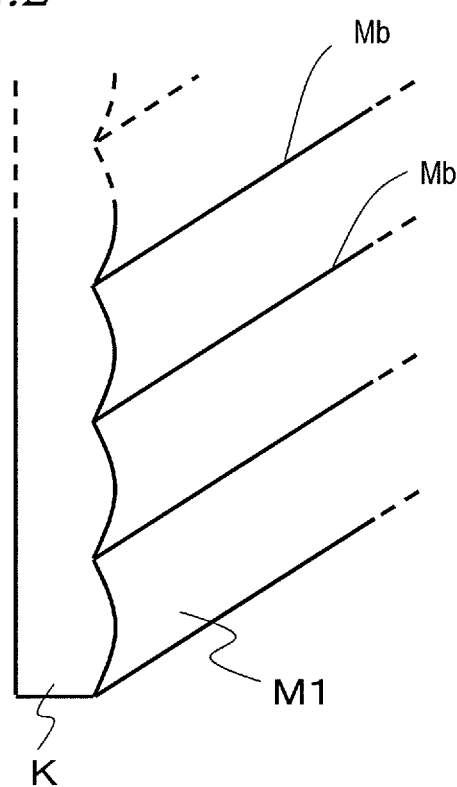

FIG. 1B is a schematic enlarged view of part G in FIG. 1A (the array-form optical element K and the imaging device N). The array-form optical element K has a shape as shown in an isometric view of FIG. 2. The array-form optical element K is typically located along a face vertical to the optical axis of the lens optical system. At a face of the array-form optical element K that is on the side of the imaging device N, a plurality of lengthy optical components M1 extending in a lateral direction (row direction) are arrayed in a longitudinal direction (column direction). A cross-section (in the longitudinal direction) of each optical component M1 has a shape curved protruding toward the imaging device N. As can be seen, the array-form optical element K has a structure of a lenticular lens. The array-form optical element K is located such that the face thereof at which the optical components M1 are formed is directed toward the imaging plane Ni.

The imaging device N includes a plurality of pixel groups Pg1, Pg2 and Pg3 arrayed in the longitudinal direction (column direction) on the imaging plane Ni. The pixel groups Pg1, Pg2 and Pg3 each have a plurality of first pixels P1 and a plurality of second pixels P2.

As shown in FIG. 1B, each optical component M1 corresponds to one of the pixel groups Pg1, Pg2 and Pg3, and a border position Mb between each two adjacent optical components M1 of the array-form optical element K is offset by Δs with respect to a border position Nb between each two adjacent pixel groups Pg on the imaging plane Ni of the imaging device N. The border position Mb between each two adjacent optical components M1 is a part along which the curved surfaces of each two adjacent optical components M1 are connected to each other. The border position Mb is, for example, a straight line extending in the lateral direction (row direction). The border position Nb between the pixel group Pg1 and the pixel group Pg2 on the imaging plane Ni is equidistant from the first pixels P1 of the pixel group Pg1 and the second pixels P2 of the pixel group Pg2. The border position Nb is, for example, a straight line extending in the lateral direction (row direction). In the case where a microlens array Ms is provided on a surface of the imaging plane Ni, the border position Nb may match a border position Mc between each two lenses of the microlens array Ms adjacent in the longitudinal direction (column direction).

Although not shown, the border position Mb between each two adjacent optical components M1 of the array-form optical element K is offset in the longitudinal direction (column direction) with respect to the border position Nb between each two adjacent pixel groups Pg over an area from a central area of the imaging plane of the lens optical system L (the optical axis and the vicinity thereof) to a peripheral area of the imaging plane (outside the optical axis and the vicinity thereof). An amount of offset in the central area of the imaging plane is the same as an amount of offset in the peripheral area of the imaging plane. Namely, the border position Mb between each two adjacent optical components M1 is offset in the longitudinal direction (column direction) with respect to the corresponding border position Nb between each two adjacent pixel groups Pg in the entirety of the imaging plane, and the offset amount is the same regardless of the distance from the optical axis. Owing to such a structure, the light beam R can be incident with the amount of light incident on the pixel P1 on the imaging plane Ni being different from the amount of light incident on the pixel P2. In this embodiment, in order to raise the light collection efficiency of the light beam R, the microlens array Ms is provided so as to cover the surface of the pixels P1 and P2 on the imaging plane Ni of the imaging device N. Parameters such as the refractive index of the array-form optical element K, the distance from the imaging plane Ni, the radius of curvature of the surface of the optical components M1 and the like are each set to an appropriate value.

Figure 3A:
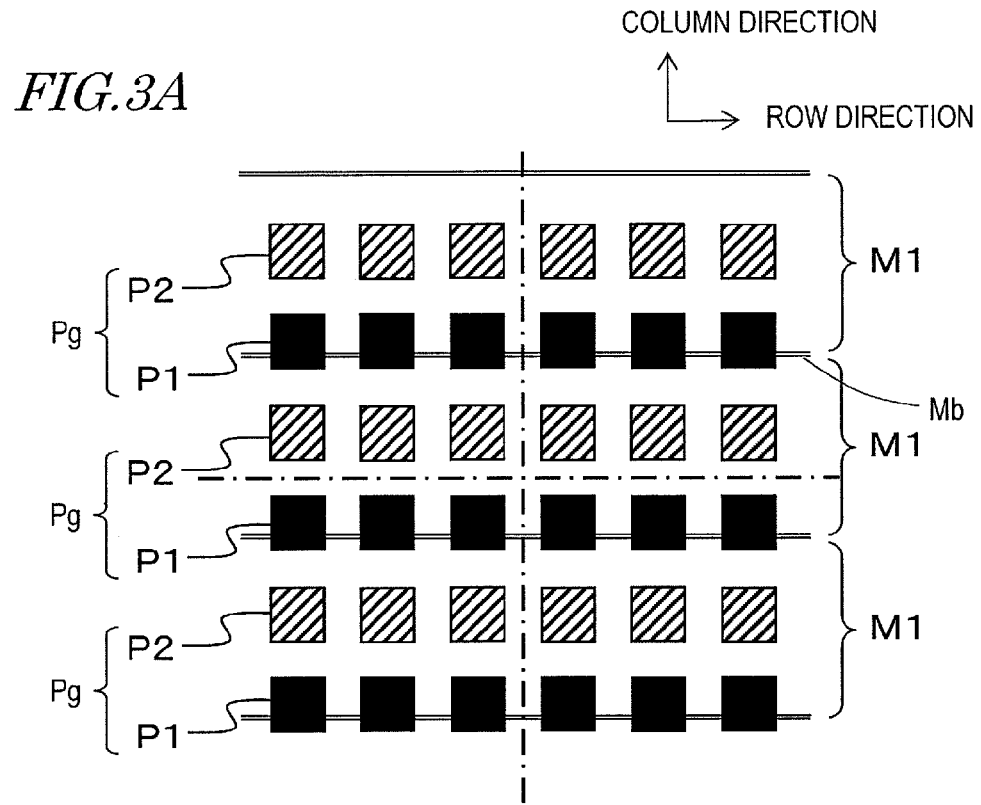
Figure 3B:
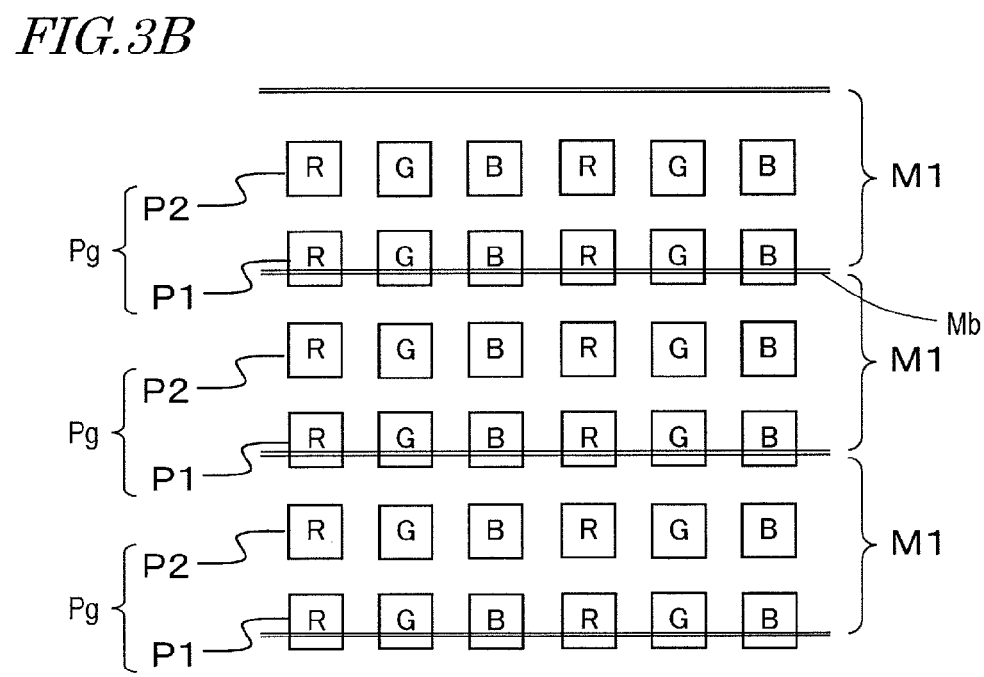

FIGS. 3A and 3B show the positional relationship between the optical components M1 of the array-form optical element K and the pixel groups Pg on the imaging device N. FIGS. 3A and 3B show the positional arrangement of the optical components M1 and the pixel groups Pg as seen in a plan view (in a plane vertical to the optical axis V). FIG. 3A shows a case of a monochromatic imaging device in which all the pixels detect single-color luminance information. FIG. 3B shows a case of a color imaging device in which the pixels detect luminance information of three colors of red (R), green (G) and blue (B).

On the imaging plane Ni, the pixels are arrayed in rows and columns. The pixels are classified into the pixels P1 and the pixels P2. In the longitudinal direction (column direction), the pixels P1 and the pixels P2 are located alternately. One row of pixels P1 and one row of pixels P2 form one pixel group Pg. In FIG. 3B in which the imaging device is a color imaging device, the red (R), green (G) and blue (B) pixels are located in repetition in the lateral direction (row direction).

The plurality of optical components M1 are arrayed in the longitudinal direction (column direction). The plurality of the optical components M1 respectively correspond to the plurality of pixel groups Pg each including two rows of pixels, namely, one row of pixels P1 and one row of pixels P2. The plurality of optical components M1 are offset in the longitudinal direction (column direction) with respect to the plurality of corresponding pixel groups Pg. As shown in FIGS. 3A and 3B, the first pixels P1 and the border positions Mb overlap each other as seen in a plan view.

On each column of pixels in each pixel group Pg, light from the same part of the subject is incident. In this embodiment, the ratio between the amounts of light incident on the pixel P1 and the pixel P2 can be adjusted by an offset amount Δs of the border position between each two optical components M1 of the array-form optical element K with respect to the border position between each two adjacent pixels on the imaging plane Ni of the imaging device N.

The first signal processing section C shown in FIG. 1A generates an image based on a pixel value (for example, a gray scale value) acquired by the plurality of pixels P1 and a pixel value acquired by the plurality of pixels P2.

As described above, the ratio between the amounts of light incident on the pixel P1 and the pixel P2 can be adjusted by the offset amount Δs. In the case where the offset amount Δs is set such that the amount of light incident on the pixel P2 is larger than the amount of light incident on the pixel P1, even when light of an amount larger than a detectable amount is supplied to the pixel P2 (when the pixel value of the pixel P2 is saturated), the value detected by the pixel P1 can be used to calculate an accurate brightness of the subject. By contrast, when light of an amount within a range of amount detectable by the pixel P2 is supplied to the pixel P2 (when the pixel value of the pixel P2 is not saturated), the value detected by the pixel P2 is usable. A specific process performed on the acquired pixel value will be described later.

Now, a method for acquiring a high dynamic range image will be described.

Figure 4:
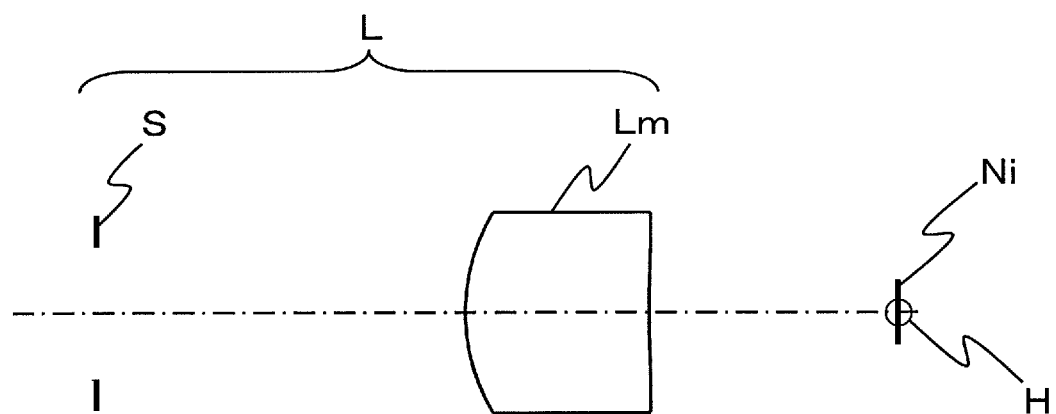

FIG. 4 is a cross-sectional view showing the imaging apparatus A in Embodiment 1. In FIG. 4, parts and elements identical to those in FIG. 1A bear identical reference signs thereto. An area H in FIG. 4 actually includes the array-form optical element K (shown in FIG. 1A, etc.) although not shown in FIG. 4. The area H has a structure shown in FIG. 1B.

Table 1 and Table 2 show design data of the optical system L of the imaging apparatus A shown in FIG. 4. In Table 1 and Table 2, Ri represents the paraxial radius of curvature (mm) of each face, di represents the inter-center distance (mm) of each face, nd represents the refractive index of d line of the lens or the filter, and vd represents the Abbe number of the d line of each optical element. Regarding the face number in Table 1 and Table 2, the R1 face and the R2 face are respectively an object-side face and an image-side face of the lens Lm in FIG. 4. The aspheric shape is represented by expression 1 where x is the distance in the direction of the optical axis from the tangential plane of the apex of the face, h is the height from the optical axis, r is the paraxial radius of curvature, k is the conic constant, and $A_m$ (m=4, 6, 8, 10) is the m-order aspheric constant.

$$x = \frac{\frac{1}{r}h^2}{1+\sqrt{1-(1+k)\left(\frac{1}{r}\right)^2 h^2}} + A_4 h^4 + A_6 h^6 + A_8 h^8 + A_{10} h^{10}$$ [Expression 1]

TABLE 1

Lens data
Focal distance = 10 mm; F value = 2.8; wavelength: 550 nm
Angle of view 2ω = 10°; effective diameter of imaging circle = ϕ1.75 mm

| Face number | Ri | di | nd | vd |
|---|---|---|---|---|
| Object | ∞ | 4000 | — | — |
| Stop | ∞ | 10 | — | — |
| R1 face | 5.332237 | 5 | 1.5253 | 56.0 |
| R2 face | −319.8501 | 6.75 | — | — |
| Image plane | ∞ | — | — | — |

TABLE 2

Aspheric constant

| | k | A4 | A6 | A8 | A10 |
|---|---|---|---|---|---|
| R3 face | −0.2969869 | 0.000421138 | −0.000059237 | 0.000016321 | −0.000001294 |
| R4 face | 0 | 0.00274336 | −0.000566209 | 0.000216386 | −0.000026416 |

Now, optical ray tracing simulation and an acquired image in this embodiment will be described.

Figure 5A:
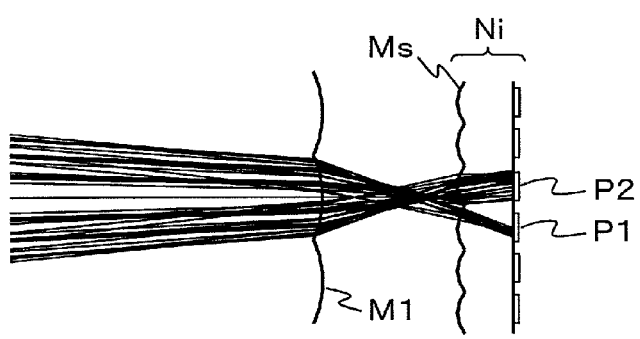
FIG. 5B is a simulated image picked up by the imaging plane Ni.
FIG. 5C shows an image generated by extracting the even-numbered columns of the simulated image and complementing the odd-numbered columns thereof.
FIG. 5D shows an image generated by extracting the odd-numbered columns of the simulated image and complementing the even-numbered columns thereof.

FIG. 5A shows optical ray tracing simulation, which shows how the light rays passing through the array-form optical element K reach pixels on the imaging device. The border positions between the plurality of optical components of the array-form optical element K are respectively offset with respect to the border positions between the pixels of the imaging device by ¼ of the pixel pitch. Owing to such a structure, as shown in the schematic view of FIG. 1B, the amount of light incident on the pixel P1 on the imaging plane Ni can be made different from the amount of light incident on the pixel P2.

Figure 5B:
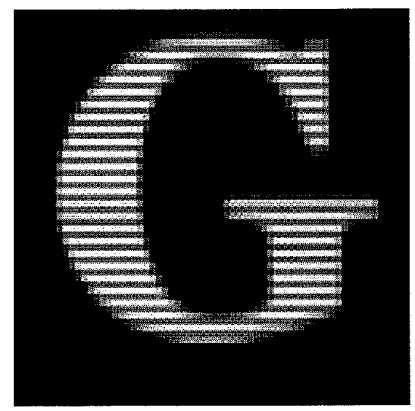

FIG. 5B shows a simulated image obtained on the imaging plane Ni when the letter "G" as a subject is drawn on a 100 mm×100 mm plane at a position away from the stop S by 4 m in the case where the array-form optical element K and the imaging plane Ni have the positional relationship shown in FIG. 5A. The image of FIG. 5B is found by simulation where the pixel pitch on the imaging device N shown in FIG. 5A is set to 3.75 μm and the pitch of the optical components M1 of the array-form optical element K is set to 7.5 μm.

Figure 5C:
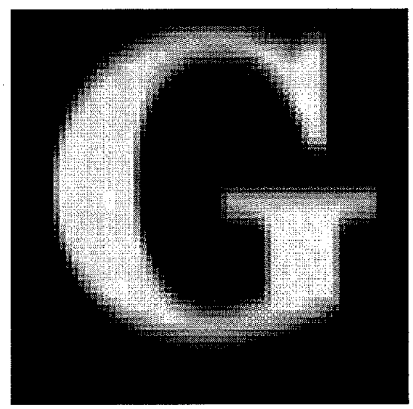
Figure 5D:
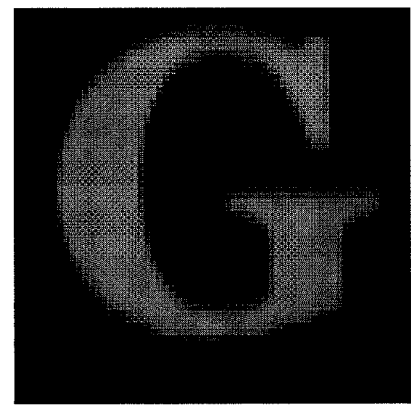

In the image of FIG. 5B, bright and dark stripes appear because the border positions between the plurality of optical components of the array-form optical element K are offset with respect to the border positions between the pixels of the imaging device. FIG. 5C shows an image generated by extracting the even-numbered columns of the simulated image of FIG. 5B and complementing the odd-numbered columns thereof. FIG. 5D shows an image generated by extracting the odd-numbered columns of the simulated image of FIG. 5B and complementing the even-numbered columns thereof. The brightness ratio between the image of FIG. 5C and the image of FIG. 5D is about 2:1.

When the border positions between the plurality of optical components of the array-form optical element K are respectively offset with respect to the border positions between the pixels of the imaging device by ½ of the pixel pitch, the brightness ratio can be further raised.

Figure 6A:
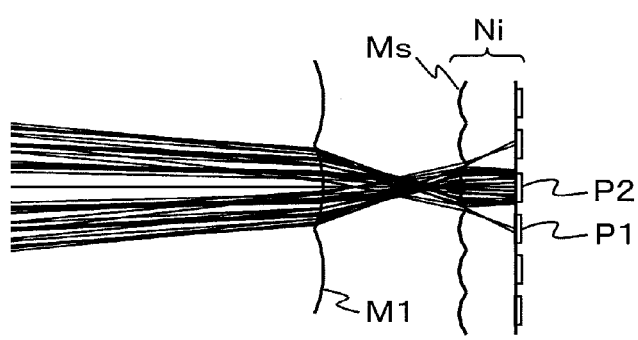
FIG. 6A shows optical ray tracing simulation, which shows how the light rays passing through the array-form optical element K in Embodiment 1 according to the present invention reach the imaging device N.

FIG. 6A shows optical ray tracing simulation, which shows how the light rays passing through the array-form optical element K reach pixels on the imaging device like FIG. 5A. The border positions between the plurality of optical components of the array-form optical element K are respectively offset with respect to the border positions between the pixels of the imaging device by ½ of the pixel pitch.

Figure 6B:
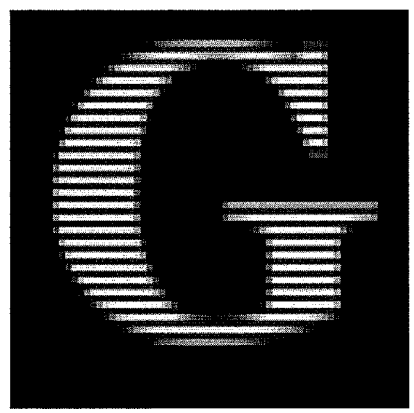
FIG. 6B is a simulated image picked up by the imaging device N.
Figure 6C:
FIG. 6C shows an image generated by extracting the even-numbered columns of the simulated image and complementing the odd-numbered columns thereof.
Figure 6D:
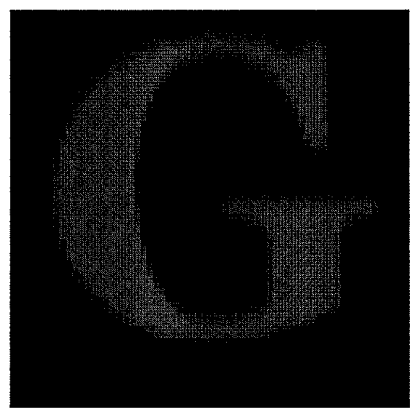
FIG. 6D shows an image generated by extracting the odd-numbered columns of the simulated image and complementing the even-numbered columns thereof.

In the image of FIG. 6B, bright and dark stripes appear because the border positions between the plurality of optical components of the array-form optical element K are offset with respect to the border positions between the pixels of the imaging device. It is seen that the contrast of the bright and dark strips is higher than that in FIG. 5B. FIG. 6C shows an image generated by extracting the even-numbered columns of the simulated image of FIG. 6B and complementing the odd-numbered columns thereof. FIG. 6D shows an image generated by extracting the odd-numbered columns of the simulated image of FIG. 6B and complementing the even-numbered columns thereof. The brightness ratio between the image of FIG. 6C and the image of FIG. 6D is about 3:1.

In the examples of FIG. 5 and FIG. 6, the brightness ratio between the images is about 2:1 and about 3:1. The brightness ratio between the images can be further raised by controlling the distance between the array-form optical element K and imaging plane Ni or the lens shape of the array-form optical element.

As described above, in this embodiment, two images having different exposure values can be acquired at the same time.

FIG. 7 is a flowchart for generating a high dynamic range image from the pixel value of the pixel P1 and the pixel value of the pixel P2. The process shown in FIG. 7 is executed by the signal processing section C in FIG. 1A. The following description will be given with an assumption that the pixel value of pixel P1 and the pixel value of the pixel P2 are each 8 bits (256 gray scale).

First, the pixel value of pixel P1 and the pixel value of the pixel P2 are read from the imaging device (S101). The pixel value of pixel P1 and the pixel value of the pixel P2 are respectively V1 and V2. Next, it is determined whether or not the pixel P1 is saturated (S102). Since the pixel value is 8 bits, it is determined that the pixel P1 is saturated when the pixel value is 255 and that the pixel P1 is not saturated when the pixel value is less than 255. When the pixel P1 is not saturated (No in S102), the output value Vo is set to V1 (S103). By contrast, when the pixel P1 is saturated (Yes in S102), the output value Vo is set to a value obtained by multiplying V2 by a ratio A between the amount of light incident on the pixel P1 and the amount of light incident on the pixel P2 (S104). The ratio A between the amounts of incident light may be calculated by simulation from the design values of the array-form optical element K (offset amount Δs between the border positions between the plurality of optical components of the array-form optical element K and the border positions between the pixels of the imaging device, distance between the array-form optical element K and the imaging plane Ni, lens shape of the array-form optical element, etc.) or may be found by actual measurement. The ratio between the amounts of incident light calculated or measured in advance is stored on a storage section before the product is shipped and is used for each imaging procedure. The storage section is provided inside or outside the signal processing section shown in FIG. 1A. The above-described operations are executed for each of all the pixels P1 and P2, and as a result, information on a high dynamic range image can be generated.

As described above, in the case where the pixel P1 is saturated, the output value is the value obtained by multiplying the pixel value of the pixel P2 by the ratio A between the amounts of incident light (A>1). Since A>1, each pixel value of the generated image is larger than 8 bits. In order to display the generated image having a pixel value larger than 8 bits on, for example, an 8-bit display device, the dynamic range needs to be compressed. If the pixel value is compressed in proportion to the compression of the dynamic range, image information of the dark area is lost. Therefore, it is desirable that the dynamic range is compressed while the gray scale of the dark area is maintained by logarithm conversion, table conversion or the like.

The optical system of the imaging apparatus shown in Table 1 and Table 2 is an image-side telecentric optical system. Owing to this, even if the angle of view is changed, the principal light ray is incident on the array-form optical element K at an angle closer to 0°. Therefore, the amount of light reaching the pixel P1 and the amount of light reaching the pixel P2 can be kept constant over the entirety of the imaging area.

In Embodiment 1, the lens Lm is formed of one lens. Alternatively, the lens Lm may be formed of a plurality of groups of lenses or a plurality of lenses.

As described above, the signal processing section C may be provided outside the imaging apparatus A. In this case, a system including the imaging apparatus and the signal processing section performs substantially the same process as the imaging apparatus A shown in FIG. 1, and thus a high dynamic range image can be acquired.

Embodiment 2

In Embodiment 2, unlike in Embodiment 1, the array-form optical element is formed on the imaging plane. Substantially the same points as those of Embodiment 1 will not be described in detail.

Figure 8A:
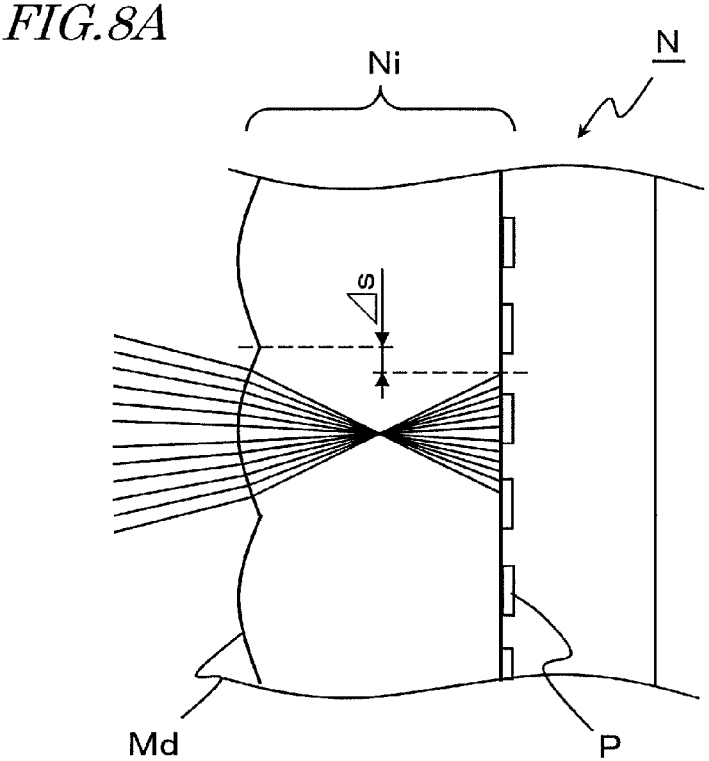
FIGS. 8A and 8B are enlarged views of the array-form optical element K and the imaging device N in Embodiment 2 according to the present invention.
Figure 8B:
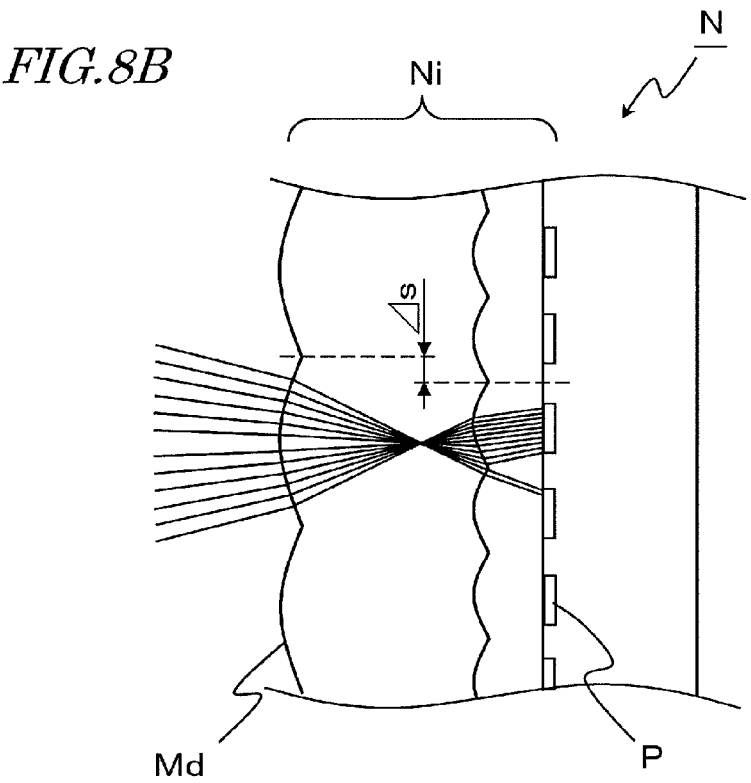

FIGS. 8A and 8B are enlarged views of the array-form optical element K and the imaging device N. In this embodiment, the array-form optical element K including a plurality of optical components Md are formed on the imaging plane Ni of the imaging device N. The array-form optical element K is formed of a lenticular lens. As in Embodiment 1, etc., the pixels P are arrayed in rows and columns on the imaging plane Ni. Like in Embodiment 1, the border position between each two adjacent optical components Md is offset by Δs with respect to the border position between each two adjacent pixels on the imaging plane Ni of the imaging device N. FIG. 8B shows a modification of this embodiment. In the structure of FIG. 8B, the microlens array Ms is formed on the imaging plane Ni so as to cover the pixels P, and the array-form optical element is stacked on the microlens array Ms. The structure of FIG. 8B can raise the light collection efficiency as compared with the structure of FIG. 8A.

When the array-form optical element is separate from the imaging device as in Embodiment 1, it is difficult to positionally align the array-form optical element and the imaging device. Owing to the structure of Embodiment 2 in which the array-form optical element is formed on the imaging device, the positional alignment thereof can be performed by a wafer process. Thus, the positional alignment is made easy and the precision thereof can be raised.

Embodiment 3

In Embodiment 3, unlike in Embodiment 1, the optical system is an image-side non-telecentric optical system, and the offset amount of the border positions of the plurality of optical components of the array-form optical element K located in the peripheral area of the imaging plane of the lens optical system L (outside the optical axis and the vicinity thereof) is different from the offset amount of the border positions between the plurality of optical components located in the central area of the imaging plane of the lens optical system L (the optical axis and the vicinity thereof).

Figure 9:
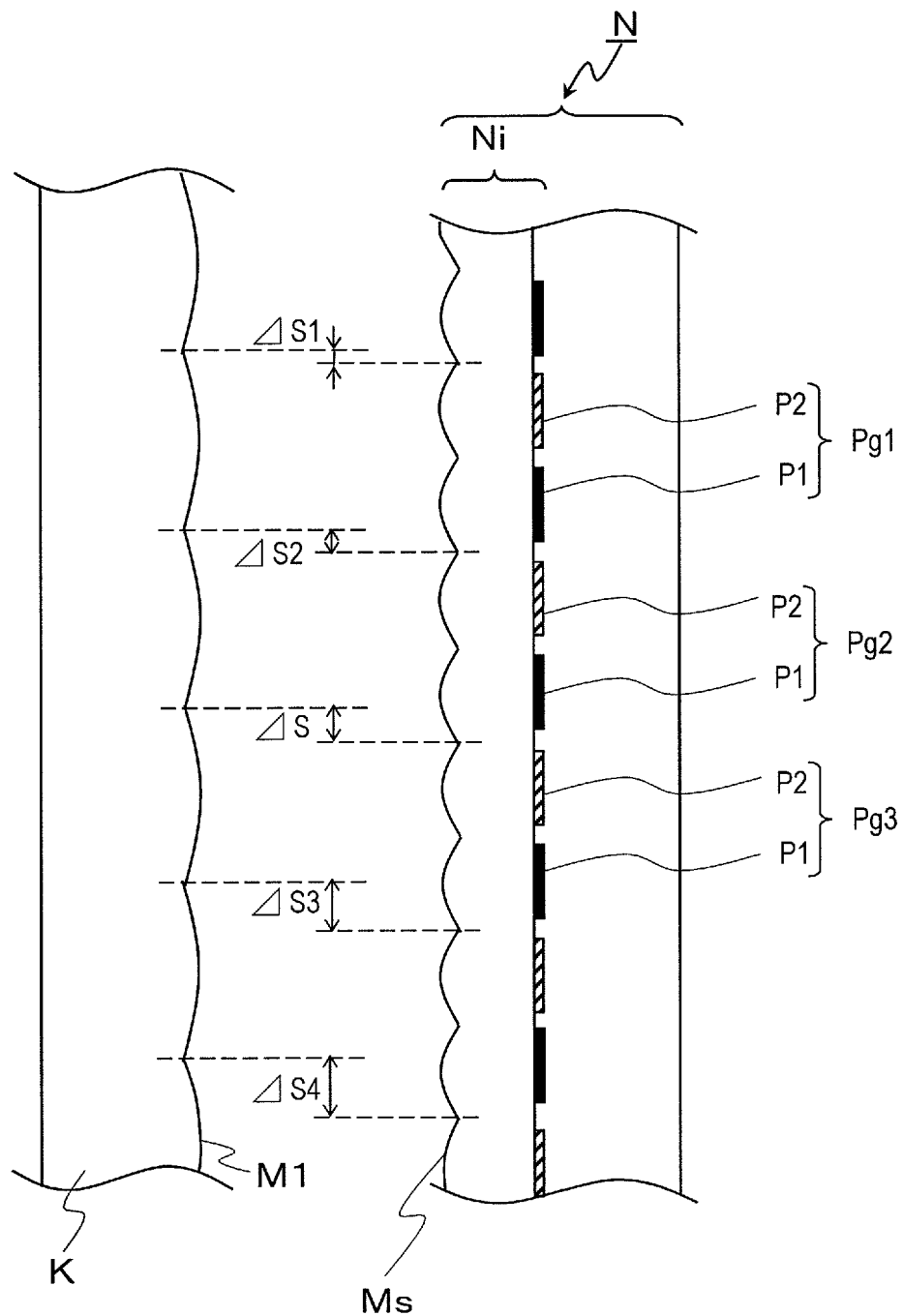
FIG. 9 is a cross-sectional view showing the array-form optical element K and the imaging device N in the case where a lens optical system L is an image-side non-telecentric optical system.
Figure 10A:
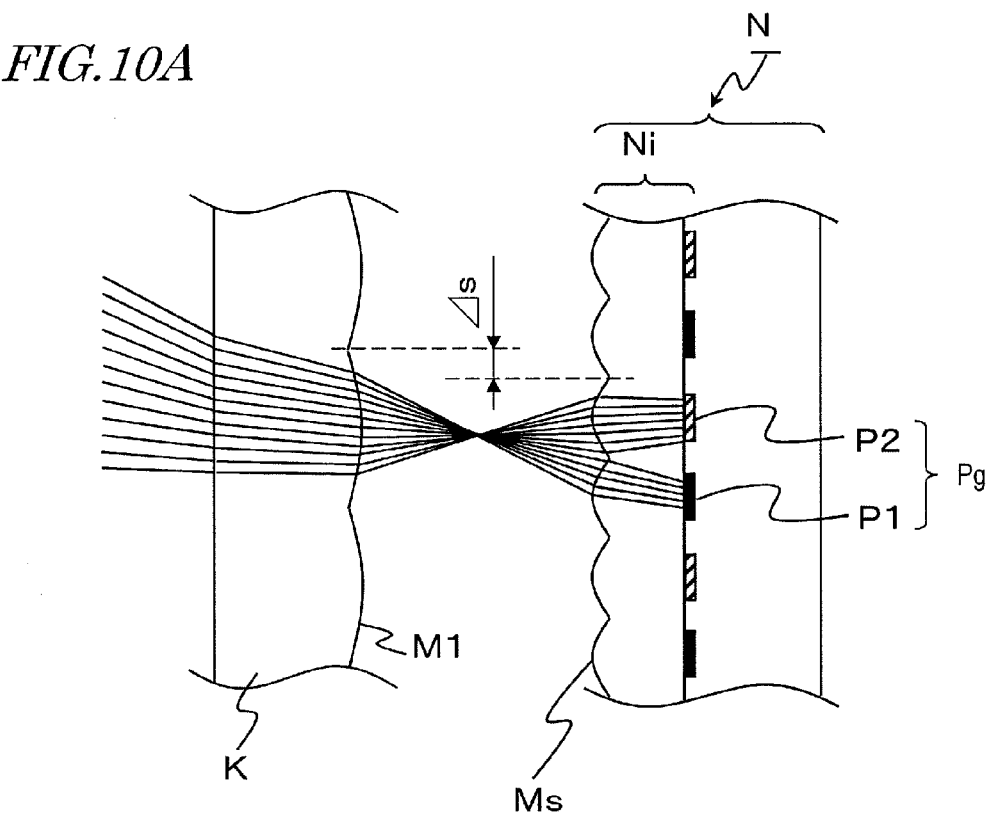
FIG. 10A is an enlarged view of the vicinity of the imaging plane in the case where the ratio between an amount of light incident on a first pixel P1 and an amount of light incident on a second pixel P2 outside the vicinity of the optical axis is different from such a ratio in the vicinity of the optical axis in Embodiment 3 according to the present invention.

FIG. 9 is a cross-sectional view showing the array—form optical element K and the imaging device N in the case where the lens optical system L is an image-side non-telecentric optical system. In FIG. 9, the pixel group closest to the optical axis of the lens optical system L is the pixel group Pg2, which is located in the "central area of the imaging plane of the lens optical system L (the optical axis and the vicinity thereof)". The other pixel groups Pg1 and Pg3 are located in the "peripheral area of the imaging plane of the lens optical system L (outside the optical axis and the vicinity thereof)". As shown in FIG. 9, regarding the offset amount in the longitudinal direction (column direction), Δs1 is smallest and becomes gradually larger in the order of Δs2, Δs, Δs3 and Δs4. Where the position of incidence of the light ray on the optical component M1 is above the optical axis, the offset amount (Δs1, Δs2) is set to be smaller than the offset amount Δs where the position of incidence of the light ray on the optical component M1 is closer to the optical axis. By contrast, where the position of incidence of the light ray on the optical component M1 is below the optical axis, the offset amount (Δs3, Δs4) is set to be larger than the offset amount Δs where the position of incidence of the light ray on the optical component M1 is closer to the optical axis. FIG. 10A is an enlarged view of the peripheral area of the imaging plane of the lens optical system L in the case where the lens optical system L is an image-side non-telecentric optical system (outside the optical axis and the vicinity thereof). In FIG. 10A, the offset amount of the border positions between the optical components M1, with respect to the border positions between the pixel groups Pg, is substantially the same as the offset amount Δs of the image-side telecentric optical system (or the offset amount of the central area of the imaging plane of the image-side non-telecentric optical system (the optical axis and the vicinity thereof). As shown in FIG. 10A, in the case where the lens optical system L is an image-side non-telecentric optical system, the light rays are incident obliquely in the peripheral area of the imaging plane. Therefore, if the offset amount of the border positions between the plurality of optical components of the array-form optical element K located in the peripheral area of the imaging plane of the lens optical system L (outside the optical axis and the vicinity thereof) is the same as the offset amount of the border positions between the plurality of optical components located in the central area of the imaging plane of the lens optical system L (the optical axis and the vicinity thereof), the ratio between the amount of light reaching the pixel P1 and the amount of light reaching the pixel P2 is different from the ratio between the amount light reaching the pixel P1 and the amount of light reaching the pixel P2 in the central area of the imaging plane of the lens optical system L (the optical axis and the vicinity thereof).

Figure 10B:
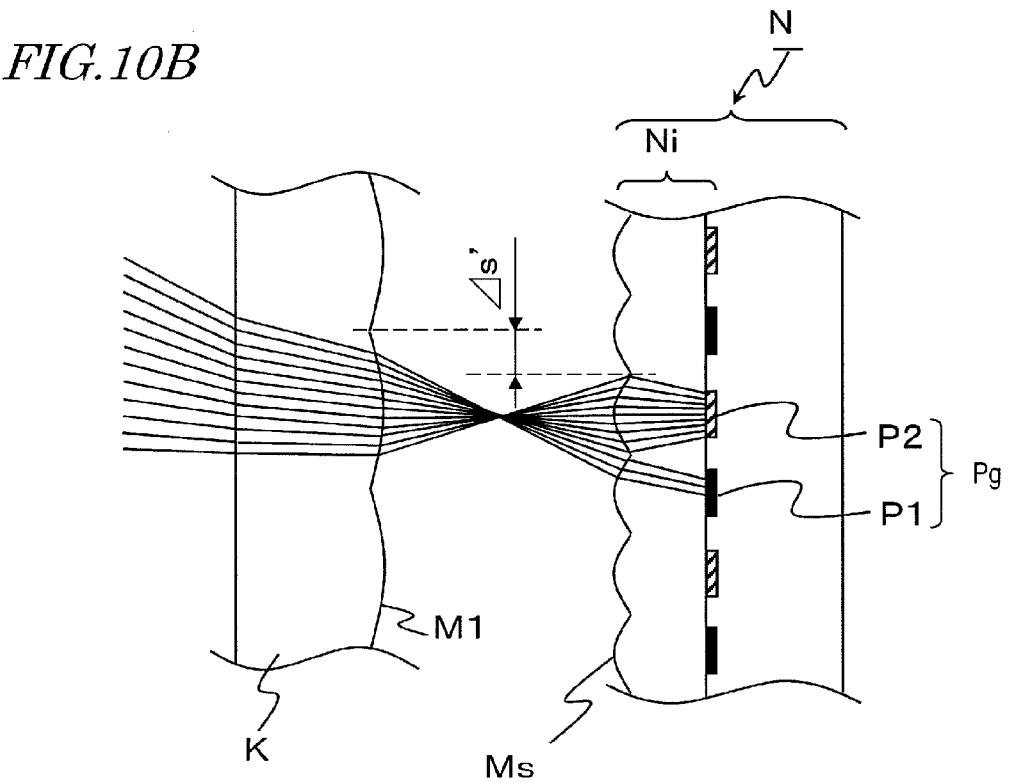
FIG. 10B is an enlarged view of the vicinity of the imaging plane in the case where the ratio between the amount of light incident on the first pixel P1 and the amount of light incident on the second pixel P2 outside the vicinity of the optical axis is equal to such a ratio in the vicinity of the optical axis.

In the meantime, as shown in Embodiment 1, the ratio between the amount of light reaching the pixel P1 and the amount of light reaching the pixel P2 can be controlled by the offset amount of the border positions between the plurality of optical components of the array-form optical element K, with respect to the border positions between the pixels of the imaging device. Therefore, in the case where the light rays are incident obliquely on the array-form optical element in the peripheral area of the image, the offset amount in the peripheral area is made different from the offset amount in the central area of the image, so that the amount of light reaching the pixel P1 and the amount of light reaching the pixel P2 can be made equivalent to each other. Where the offset amount when the amount of light reaching the pixel P1 and the amount of light reaching the pixel P2 are equivalent to each other is Δs', when the position of incidence of the light ray on the array-form optical element is below the optical axis as shown in FIG. 10B, the offset amount Δs' is set to be larger than Δs shown in FIG. 10A. By contrast, when the position of incidence of the light ray on the array-form optical element is above the optical axis as shown in FIG. 10B, the offset amount Δs' is set to be smaller than Δs shown in FIG. 10A. The position of incidence of the light ray on the array-form optical element varies in accordance with the image height. Therefore, the offset amount is appropriately set in accordance with the image height so that the offset amount is different in accordance with the distance from the optical axis, so that the amount of light reaching the pixel P1 and the amount of light reaching the pixel P2 can be made equivalent to each other over the entirety of the image area.

The image-side non-telecentric optical system allows the optical length to be shorter than that of the image-side telecentric optical system, and thus can reduce the size of the imaging apparatus.

Embodiment 4

In Embodiment 4, unlike in Embodiment 1, a driving mechanism is included for controlling the position of the array-form optical element in a direction vertical to the optical axis of the lens optical system.

Figure 11:
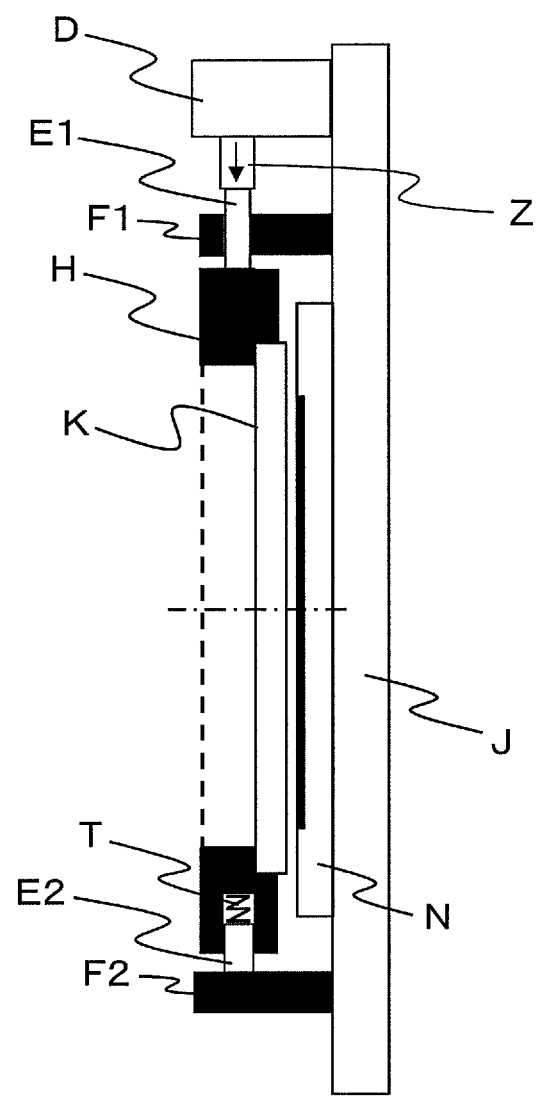
FIG. 11 is a cross-sectional view of a driving mechanism for the array-form optical element K in Embodiment 4 according to the present invention.

FIG. 11 is a cross-sectional view of the driving mechanism for controlling the position of the array-form optical element K in Embodiment 4. In FIG. 11, the imaging device N is mounted on a substrate J. Both of two ends of the array-form optical element K (both of two ends of the array-form optical element K and the imaging device N in the longitudinal direction (column direction)) are each held by a holding member H as facing the imaging device N. One of the two holding members H is connected to a first shaft E1, and the other holding member H is connected to a second shaft E2 via a compression coil spring T. The first shaft E1 is guided by a shaft guide F1 mounted on the substrate J and moves the array-form optical element K held by the holding members H by displacement of a piezoelectric actuator Z. One surface of the piezoelectric actuator Z is fixed by a holding member D mounted on the substrate J. The second shaft E2 is held by a shaft holder F2 mounted on the substrate J. The holding member H connected to the second shaft E2 has a guide hole formed therein. Inside the guide hole, the compression coil spring T is provided. The compression coil spring T is connected to the second shaft E2 in the guide hole.

Now, position control of the array-form optical element K performed by the piezoelectric actuator Z will be described. The piezoelectric actuator Z is displaced in the direction of the arrow by an applied voltage. One surface of the piezoelectric actuator Z is fixed by the holding member D. Therefore, when being displaced by an applied voltage, the piezoelectric actuator Z presses the shaft E1 and thus the holding member H, which is holding the array-form optical element K. As a result, the position of the array-form optical element K can be changed in a direction vertical to the optical axis of the lens optical system. When the piezoelectric actuator Z is released from the voltage, the array-form optical element K is returned to the original position thereof by a repulsive power of the compression coil spring T which is located between the holding member H and the shaft E2.

The above-described displacement is controllable by the voltage applied to the piezoelectric actuator Z. Therefore, the value of the offset amount Δs shown in FIG. 1B in Embodiment 1 can be freely controlled. Thus, the brightness ratio between two images acquired at the same time can be controlled.

The offset amount Δs can be made 0. In such a case, the amount of light incident on the pixel P1 on the imaging plane Ni can be the same as the amount of light incident on the pixel P2 as in the light ray tracing simulation shown in FIG. 12A.

FIG. 12B is a simulated image obtained on the imaging plane Ni in the case where the offset amount Δs is 0. In the simulated image in FIG. 12B, the amount of light incident on the pixel P1 on the imaging plane Ni is the same as the amount of light incident on the pixel P2. Therefore, unlike in Embodiment 1, the bright and dark stripes do not appear.

FIG. 12C shows an image generated by extracting the even-numbered columns of the simulated image of FIG. 12B and complementing the odd-numbered columns thereof. FIG. 12D shows an image generated by extracting the odd-numbered columns of the simulated image of FIG. 12B and complementing the even-numbered columns thereof. The brightness ratio between the image of FIG. 12C and the image of FIG. 12D is 1:1.

As can be seen, when the array-form optical element K is driven such that the position thereof is controlled in the direction vertical to the optical axis of the lens optical system, the ratio between the exposure values of the two images can be optionally changed in accordance with the image pickup scene.

Embodiment 5

Embodiment 5 is directed to a distance measuring device using a plurality of imaging apparatus (or systems) shown in Embodiment 1. FIG. 13 is a schematic view of the distance measuring device using two imaging apparatus. In FIG. 13, the reference signs are the same as those in FIG. 4. In this embodiment, the array-form optical element is a lenticular lens, and an arraying direction Q in which the optical components of the lenticular lens of each imaging apparatus are arrayed is perpendicular to a base line direction B of the distance measuring device. The distance measuring device extracts parallax by pattern matching and calculates a distance to the subject by use of the extracted parallax by the principle of triangulation. Therefore, the arraying direction Q of the optical components of the lenticular lens is made perpendicular to the base line direction B, so that the resolution of the parallax extraction can be raised as compared with the case where the arraying direction Q of the optical components of the lenticular lens is the same as the base line direction B.

The distance measuring device in this embodiment can reduce the blown out highlights or blocked up shadows in the high dynamic range environment and can measure the distance even in areas in which blown out highlights or blocked up shadows occur by a conventional imaging apparatus.

Other Embodiments

The lens optical system L may be an image-side telecentric optical system or an image-side non-telecentric optical system. In the case where the lens optical system L is the image-side non-telecentric optical system, the light rays are incident obliquely in the peripheral area of the imaging plane. Therefore, light easily leaks to adjacent pixels to cause crosstalk. For preventing this, as in Embodiment 3, the offset amount of each optical component M1, Md of the array-form optical element K with respect to the border between the pixels is made different between in the central area of the imaging plane and the peripheral area of the imaging plane. However, it is not absolutely necessary to make the offset amounts different. Each optical component M1, Md of the array-form optical element merely needs to be offset with respect to the border position between the pixels over an area from the central area of the imaging plane of the lens optical system L (the optical axis and the vicinity thereof) to the peripheral area of the imaging plane (outside the optical axis and the vicinity thereof), so that the amounts of light incident on adjacent pixels are different from each other.

The imaging apparatus disclosed in the present application is useful as an imaging apparatus of a digital still camera, a digital video camera or the like. The imaging apparatus disclosed in the present application is also applicable to an imaging apparatus for monitoring the environment or the crew of an automobile, an imaging apparatus for security use, and a distance measuring device.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An imaging apparatus, comprising:
a lens optical system including a lens and a stop;
an imaging device on which light passing through the lens optical system is incident; and
an array-form optical element located between the lens optical system and the imaging device and including a plurality of optical components extending in a row direction in a plane vertical to an optical axis of the lens optical system, the plurality of optical components being arrayed in a column direction in the plane;
wherein:
the imaging device includes a plurality of pixel groups arrayed in the column direction, each of which includes a plurality of first pixels arrayed in the row direction and a plurality of second pixels arrayed in the row direction at positions adjacent, in the column direction, to the plurality of first pixels; and
border positions between the plurality of optical components are respectively offset in the column direction with respect to corresponding border positions between the plurality of pixel groups.

2. The imaging apparatus of claim 1, wherein the border positions between the plurality of optical components are respectively in offset the column direction with respect to the corresponding border positions between the plurality of pixel groups over an area from a central area to a peripheral area of an imaging plane formed of the plurality of pixel groups.

3. The imaging apparatus of claim 2, wherein each of the plurality of optical components of the array-form optical element is located so as to correspond to one of the plurality of pixel groups.

4. The imaging apparatus of claim 3, wherein in each of the plurality of pixel groups, light from the same part of a subject is incident on each of the plurality of first pixels and the second pixel adjacent thereto in the column direction.

5. The imaging apparatus of claim 1, wherein the array-form optical element is a lenticular lens.

6. The imaging apparatus of claim 1, wherein the array-form optical element is formed on the imaging device.

7. The imaging apparatus of claim 1, further comprising a microlens provided between the array-form optical element and the imaging device,
wherein the array-form optical element is formed on the imaging device with the microlens provided therebetween.

8. The imaging apparatus of claim 1, wherein:
the lens optical system is an image-side telecentric optical system; and
offset amounts of the border positions between the plurality of optical components with respect to the border positions between the plurality of pixel groups are equal to each other regardless of a distance from the optical axis in the column direction.

9. The imaging apparatus of claim 8, further comprising a driving mechanism for controlling a position of the array-form optical element in the column direction,
wherein the offset amounts are adjustable by the driving mechanism.

10. The imaging apparatus of claim 1, wherein:
the lens optical system is an image-side non-telecentric optical system; and
offset amounts of the border positions between the plurality of optical components with respect to the border positions between the plurality of pixel groups are different from each other in accordance with a distance from the optical axis in the column direction.

11. The imaging apparatus of claim 1, further comprising a signal processing section for generating an image by use of a plurality of pixel values obtained by the plurality of first pixels and a plurality of pixel values obtained by the plurality of second pixels;
wherein:
an amount of light supplied to the plurality of first pixels is A times an amount of light supplied to the plurality of second pixels (A>1); and
the signal processing section performs a process of:
reading, in each pixel group, a pixel value V1 obtained by one pixel P1 among the plurality of first pixels and a pixel value V2 obtained by one pixel P2 adjacent thereto among the plurality of second pixels;
when the pixel value V1 is not saturated, outputting the pixel value V1; and
when the pixel value V1 is saturated, outputting a value obtained by multiplying the pixel value V2 obtained by the second pixel by A.

12. The imaging apparatus of claim 11, wherein the signal processing section performs the process for each of the plurality of first pixels and each of the plurality of second pixels.

13. A system, comprising:
the imaging apparatus of claim 1; and
a signal processing section for generating an image by use of a plurality of pixel values obtained by the plurality of first pixels and a plurality of pixel values obtained by the plurality of second pixels;
wherein:
an amount of light supplied to the plurality of first pixels is A times an amount of light supplied to the plurality of second pixels (A>1); and
the signal processing section performs a process of:
reading, in each pixel group, a pixel value V1 obtained by one pixel P1 among the plurality of first pixels and a pixel value V2 obtained by one pixel P2 adjacent thereto among the plurality of second pixels;
when the pixel value V1 is not saturated, outputting the pixel value V1; and
when the pixel value V1 is saturated, outputting a value obtained by multiplying the pixel value V2 obtained by the second pixel by A.

14. A distance measuring apparatus, comprising a plurality of the imaging apparatus of claim 1.

15. An imaging device, comprising:
an array-form optical element including a plurality of optical components extending in a row direction in a prescribed plane, the plurality of optical components being arrayed in a column direction in the plane; and
a plurality of pixel groups arrayed in the column direction, each of which includes a plurality of first pixels arrayed in the row direction and a plurality of second pixels arrayed in the row direction at positions adjacent in the column direction to the plurality of first pixels;
wherein the array-form optical element is located with respect to the plurality of pixel groups such that border positions between the plurality of optical components are respectively offset in the column direction with respect to corresponding border positions between the plurality of pixel groups.

16. The imaging device of claim 15, wherein the border positions of the plurality of optical components are respectively offset in the column direction with respect to the corresponding border positions between the plurality of pixel groups over an area from a central area to a peripheral area of an imaging plane formed of the plurality of pixel groups.

17. The imaging device of claim 16, wherein each of the plurality of optical components of the array-form optical element is located so as to correspond to one of the plurality of pixel groups.

* * * * *